(12) United States Patent
Kurita et al.

(10) Patent No.: US 10,542,189 B2
(45) Date of Patent: Jan. 21, 2020

(54) PRINT CONTROL APPARATUS AND METHOD OF CONTROLLING THE SAME

(71) Applicant: CANON KABUSHIKI KAISHA, Tokyo (JP)

(72) Inventors: Masanao Kurita, Kawasaki (JP); Tsuyoshi Oya, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/012,930

(22) Filed: Jun. 20, 2018

(65) Prior Publication Data

US 2018/0376033 A1 Dec. 27, 2018

(30) Foreign Application Priority Data

Jun. 22, 2017 (JP) .................................. 2017-122471

(51) Int. Cl.
*H04N 1/60* (2006.01)
*H04N 1/00* (2006.01)

(52) U.S. Cl.
CPC ....... *H04N 1/6097* (2013.01); *H04N 1/00997* (2013.01); *H04N 1/6005* (2013.01); *H04N 1/6027* (2013.01); *H04N 1/6061* (2013.01); *H04N 1/6088* (2013.01)

(58) Field of Classification Search
CPC .. H04N 1/6097; H04N 1/6027; H04N 1/6088; H04N 1/00997; H04N 1/6005; H04N 1/6061
See application file for complete search history.

(56) References Cited

U.S. PATENT DOCUMENTS

| | | | | |
|---|---|---|---|---|
| 2002/0118380 A1* | 8/2002 | Krueger | ................. | G06K 15/02 358/1.9 |
| 2017/0272618 A1* | 9/2017 | Higashi | .................... | G09G 5/00 |
| 2018/0048845 A1* | 2/2018 | Kozuka | .................... | H04N 5/20 |

FOREIGN PATENT DOCUMENTS

JP        2014-016416 A        1/2014

* cited by examiner

*Primary Examiner* — Neil R McLean
(74) *Attorney, Agent, or Firm* — Cowan, Liebowitz & Latman, P.C.

(57) ABSTRACT

A print control apparatus that realizes printed matter that appears suitably in a case of observation by reflected light and in a case of observation by transmitted light is disclosed. The print control apparatus, based on data of a source image, generates first print data to be used for printing to a first surface of a recording medium. The print control apparatus also, based on data of the source image, generates second print data that is used for printing to a second surface that is different to the first surface and that represents a higher luminance range, in a luminance range that the data of the source image represents, than a luminance range that the first print data represents.

11 Claims, 10 Drawing Sheets

PRINT CONTROL APPARATUS AND METHOD OF CONTROLLING THE SAME

BACKGROUND OF THE INVENTION

Field of the Invention

The present invention relates to a print control apparatus and a method of controlling the same.

Description of the Related Art

Conventionally, ordinary printed matter is envisioned to be observed under an environment light such as fluorescent light or sunlight, but, an apparatus that allows transmitted light that is transmitted through printed matter to be observed by illuminating the back surface of the printed matter by a high luminance plane light source has been proposed (Japanese Patent Laid-Open No. 2014-016416).

However, the appearance of printed matter is very different in the case of observation under reflected light and the case of observation by transmitted light. For example, when printed matter, whose color or contrast is good when transmitted light that is transmitted therethrough is observed, is observed by reflected light, brightness and contrast are greatly reduced over the case of observing by the transmitted light, the color appears dull, or the like.

SUMMARY OF THE INVENTION

The present invention is made in light of this problem of the conventional technique, and provides, in one aspect, a print control apparatus that realizes printed matter that appears suitably in both the case of observation of reflected light and the case of observation of transmitted light, and a method of controlling the same.

According to an aspect of the present invention, there is provided a print control apparatus, comprising: a first generation unit configured to, based on data of a source image, generate first print data to be used for printing to a first surface of a recording medium; and a second generation unit configured to, based on data of the source image, generate second print data to be used for printing to a second surface different from the first surface, wherein the second print data represents a higher luminance range, in a luminance range that the data of the source image represents, than a luminance range that the first print data represents.

According to another aspect of the present invention, there is provided a print control apparatus, comprising: a first generation unit configured to, based on data of a source image, generate first print data to be used for printing to a first surface of a recording medium; and a second generation unit configured to, based on data of the source image, generate second print data to be used for printing to a second surface different from the first surface, wherein the second print data represents a range corresponding to a wider color gamut, in a color gamut that the data of the source image represents, than a color gamut that the first print data represents.

According to a further aspect of the present invention, there is provided a method of controlling a print control apparatus, the method comprising: based on data of a source image, first generating first print data to be used for printing to a first surface of a recording medium; and based on data of the source image, second generating second print data to be used for printing to a second surface different from the first surface, wherein the second print data represents a higher luminance range, in a luminance range that the data of the source image represents, than a luminance range that the first print data represents.

According to another aspect of the present invention, there is provided a method of controlling a print control apparatus, the method comprising: based on data of a source image, first generating first print data to be used for printing to a first surface of a recording medium; and based on data of the source image, second generating second print data to be used for printing to a second surface different from the first surface, wherein the second print data represents a range corresponding to a wider color gamut, in a color gamut that the data of the source image represents, than a color gamut that the first print data represents.

According to a further aspect of the present invention, there is provided a non-transitory computer-readable medium storing a program for causing a computer to function as a print control apparatus that comprises: a first generation unit configured to, based on data of a source image, generate first print data to be used for printing to a first surface of a recording medium; and a second generation unit configured to, based on data of the source image, generate second print data to be used for printing to a second surface different from the first surface, wherein the second print data represents a higher luminance range, in a luminance range that the data of the source image represents, than a luminance range that the first print data represents.

According to another aspect of the present invention, there is provided a non-transitory computer-readable medium storing a program for causing a computer to function as a print control apparatus that comprises: a first generation unit configured to, based on data of a source image, generate first print data to be used for printing to a first surface of a recording medium; and a second generation unit configured to, based on data of the source image, generate second print data to be used for printing to a second surface different from the first surface, wherein the second print data represents a range corresponding to a wider color gamut, in a color gamut that the data of the source image represents, than a color gamut that the first print data represents.

Further features of the present invention will become apparent from the following description of exemplary embodiments with reference to the attached drawings.

DESCRIPTION OF THE EMBODIMENTS

Exemplary embodiments of the present invention will now be described in detail in accordance with the accompanying drawings. Note that in the following embodiments, configurations in which a print control apparatus according to the invention is implemented in a general-purpose computer such as a personal computer (PC) are described, but the present invention can be implemented by any electric device capable of controlling an image forming apparatus or a printer. Such an electric device may be any of various kinds of computer devices such as a smart phone, a tablet terminal, or a game device.

(First Embodiment)

Figure 1A:
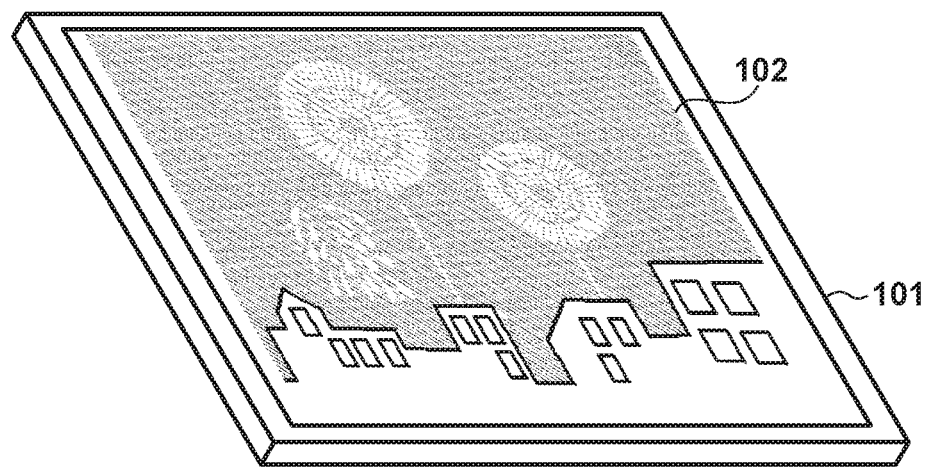
FIG. 1A and FIG. 1B are views that schematically illustrate examples of printed matter observation states.
Figure 1B:
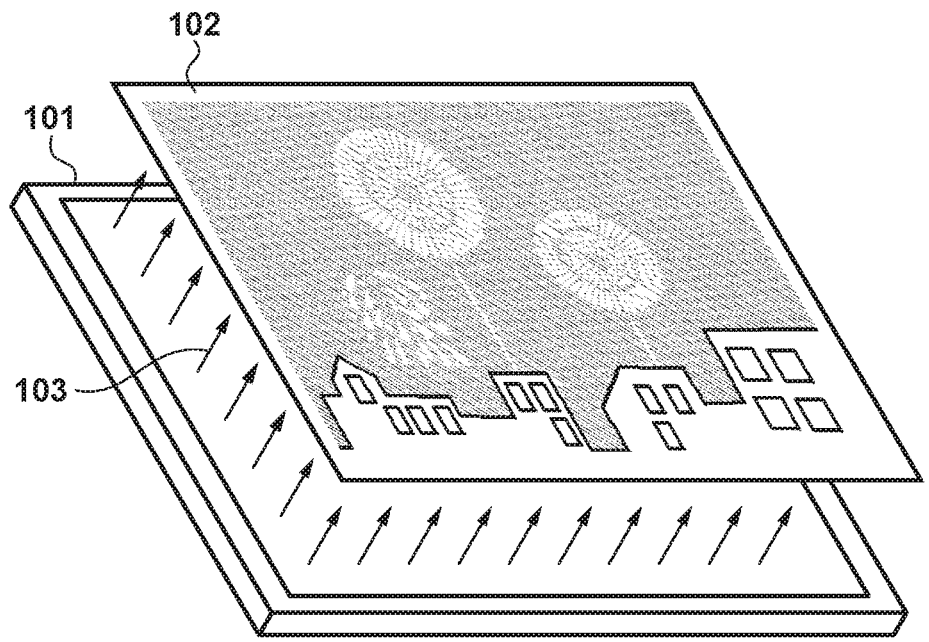

FIG. 1A and FIG. 1B are views that schematically illustrate methods of observing printed matter that is outputted in accordance with control of a print control apparatus of the present embodiment, and FIG. 1A illustrates the case where reflected light is observed while FIG. 1B illustrates the case where transmitted light is observed. Here, printed matter 102 is placed on a flat panel lighting device 101, and the flat panel lighting device 101 is turned off in the case of observation of reflected light, and the flat panel lighting device 101 is turned on in the case of observation of transmitted light. However, the flat panel lighting device 101 is unnecessary in the case of observation of reflected light.

The flat panel lighting device 101 has a white light source such as a cold-cathode tube or an LED, and the size of the light emission area is substantially the same as the size of the printed matter 102. The flat panel lighting device 101 may be called a light box or a viewer. Note that in the case where there are a plurality of light sources, the brightness of the flat panel lighting device 101 may be adjustable for each area that is defined in advance.

Note that in FIG. 1B, in order to illustrate that an illumination light 103 is being emitted from the flat panel lighting device 101, the printed matter 102 is shown as though it were separated from the flat panel lighting device 101, but actually it is placed on the light-emitting surface as is illustrated in FIG. 1A. Note that the flat panel lighting device 101 may have a member that detachably holds the printed matter 102, such as a rail or a picture-frame-shaped member for supporting the printed matter 102 on an edge. Also, in FIG. 1A to FIG. 1B, light that illuminates the printing surface of the printed matter 102 may be natural light or may be light from an artificial light source.

Figure 2:
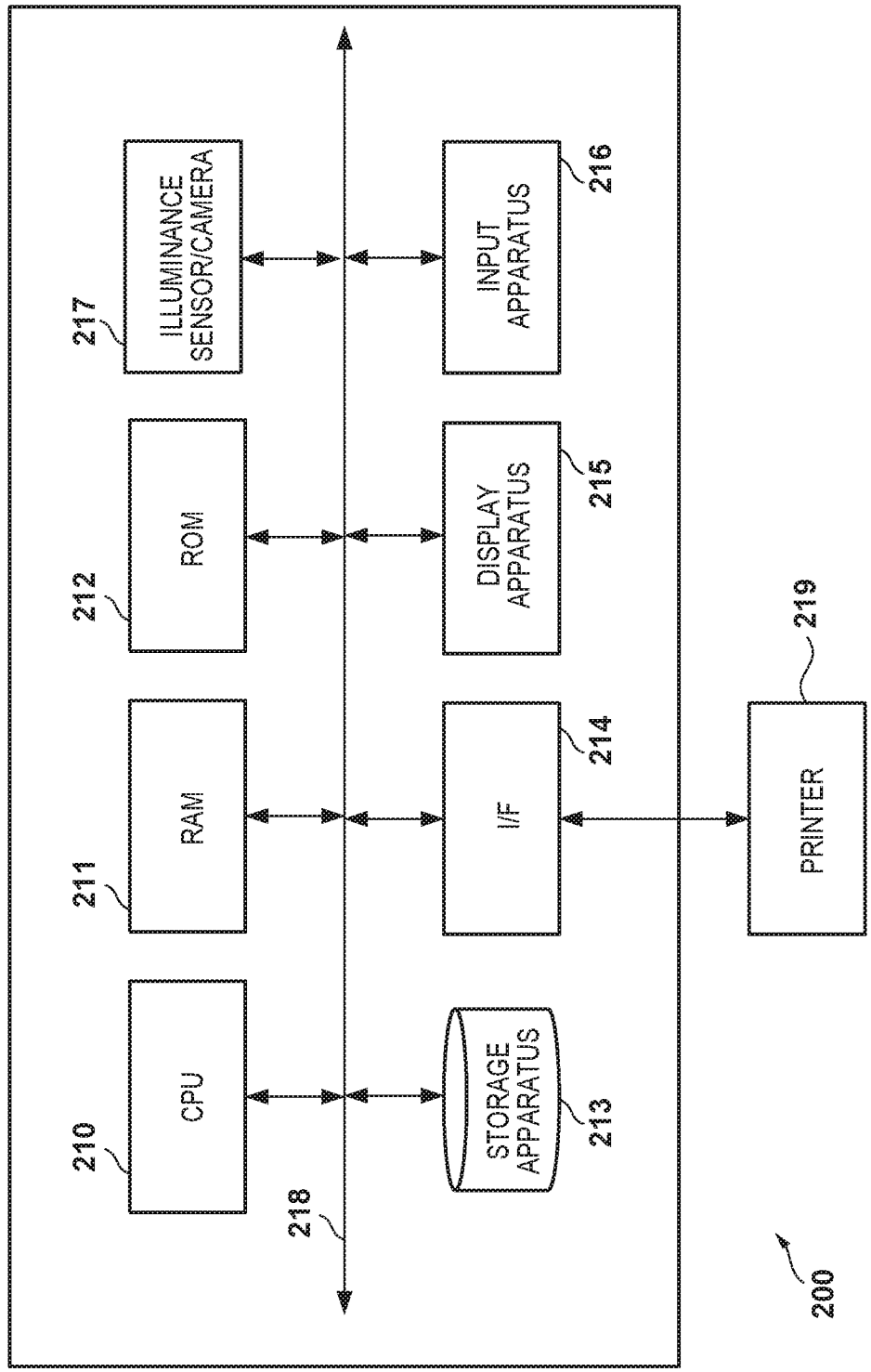
FIG. 2 is a block diagram illustrating an example of a functional configuration of a general-purpose computer that can be used as a print control apparatus according to a first embodiment.

FIG. 2 is a block diagram that schematically illustrates a functional configuration example of a general-purpose computer (PC) 200 that functions as a print control apparatus.

A CPU 210 is one or more programmable processors, and realizes functions of a PC 200 by loading into a RAM 211 a program such as an OS or an application that is stored in a ROM 212 or a storage apparatus 213 and executing the program. A display controller, a GPU, or the like may be integrated in the CPU 210. Note that operations that are described being performed by the PC 200 are actually realized by the CPU 210 executing a program.

The RAM 211 is used for loading a program that the CPU 210 executes, storing temporary information of a program, and buffering data temporarily. A portion thereof may be used as video memory for a display apparatus 215.

The ROM 212 stores a program that the CPU 210 executes, various setting values and parameters, GUI data, and the like. The ROM 212 may be rewritable.

The storage apparatus 213 stores an OS, application programs, data files, or the like. The storage apparatus 213 may be a hard disk drive, a solid state drive, or the like.

An I/F 214 is communication interface for communication with an external device, and is typically a group of interfaces that conform to a plurality of standards. For example, wired communication interfaces that conform to standards such as USB or Ethernet (registered trademark) and wireless communication interfaces that conform to standards such as wireless LAN, BlueTooth (registered trademark), mobile networks (3G, 4G, and the like) and the like may be included therein. Also, interfaces for external display that conform to a standards such as HDMI, DisplayPort, or the like may also be included in the I/F 214. A printer 219 in the present embodiment performs communication with the PC 200 via the I/F 214.

The display apparatus 215 is a liquid crystal display (LCD), for example, and the OS or an application program performs various display thereon. The display on the display apparatus 215 is controlled by the CPU 210.

An input apparatus 216 is one or more input devices for a user to input into the PC 200, such as a keyboard, a pointing device, or the like.

An illuminance sensor/camera 217 detects the brightness of an environment light in the environment of the PC 200. In a case where the PC 200 comprises a camera, the CPU 210 can detect the brightness of a desired location by generating luminance information from a captured image. In a case where the PC 200 comprises an illuminance sensor (or a luminance sensor), a signal representing a measurement value or a brightness is inputted into the CPU 210.

A bus 218 bi-directionally connects each of the above-described functional blocks such that communication therebetween is possible. The bus 218 has a control bus and a data bus.

There is no particular limitation to the type of the printer 219, and it is possible to use a printer of a publicly known type such as a laser printer, an ink-jet printer, or a dye sublimation printer. However, in consideration of observation by transmitted light, it is advantageous to use a coloring material for which light transmissiveness is good. Specifically, pigment ink is advantageous over toner, and dye ink is advantageous over pigment ink in terms of light transmissiveness. Accordingly, the printer 219 in the present embodiment is assumed to be an ink-jet printer that uses dye ink. Note that there is no particular limitation to the number of colors of coloring materials. Also, transparent ink may be used to improve the front surface smoothness of the print layer or to improve weatherability.

Figure 3A:
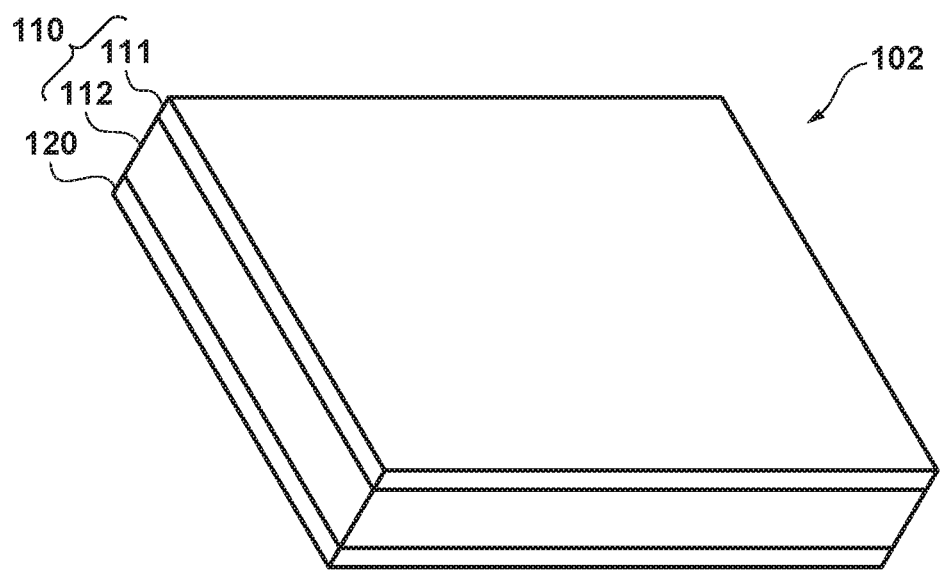
FIG. 3A and FIG. 3B are views that schematically illustrate outputted printed matter in the first embodiment.
Figure 3B:
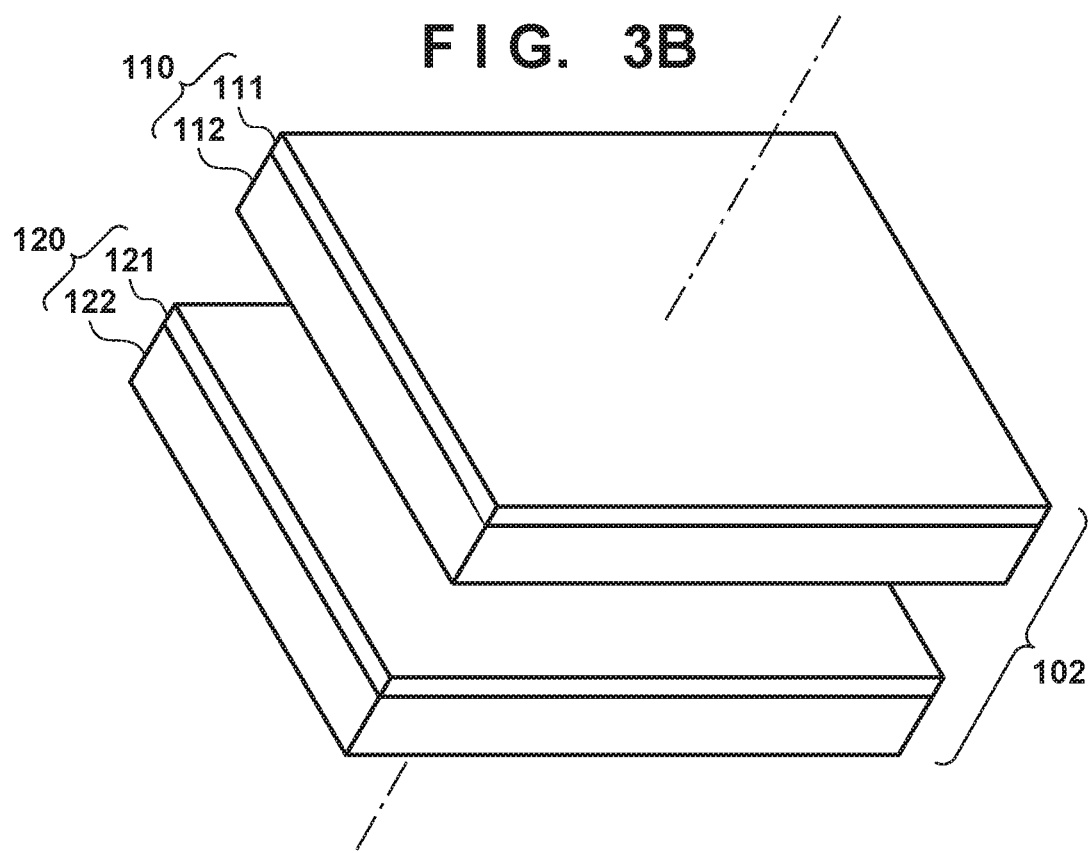

FIG. 3A to FIG. 3B are views that schematically illustrate the configuration of the printed matter 102 that is outputted in the present embodiment. FIG. 3A illustrates a configuration when configuring the printed matter 102 by a single recording medium on which double-sided printing has been performed, and FIG. 3B illustrates a configuration when configuring the printed matter 102 by overlapping two recording mediums on each of which single-sided printing has been performed. Typically, for the recording medium, paper or resin film is made to be a base material, but there is no particular limitation to the type or thickness if it is a base material through which light can pass.

In the present embodiment, a layer that contains coloring material which is formed on a recording medium by printing is called a print layer for the sake of convenience. Accordingly, the printed matter 102 on which double-sided printing has been performed has a front surface print layer 111 that is formed on a first surface of a medium layer 112 and a back surface print layer 120 that is formed on a second surface which is the reverse of the front surface print layer 111. Here, for the sake of convenience, it is assumed that for the recording medium on which double-sided printing was performed, the medium layer 112 and the front surface print layer 111 together are a first layer 110 and the back surface print layer 120 is a second layer.

Meanwhile, as illustrated in FIG. 3B, it is possible to configure the printed matter 102 by overlapping a plurality of recording mediums on each of which single-sided printing was performed. In such a case, the front surface print layer 111 formed on the recording medium, which is topmost in the overlapping in a state in which the printed matter 102 is placed on the flat panel lighting device 101, and the medium layer 112 are assumed to be the first layer 110. Also, a front surface print layer 121 and a medium layer 122 of the second recording medium from the top are assumed to be a second layer 120. In the case where there is one or two recording mediums, the surface on which the print layer included in the first layer 110 is provided is assumed to be the first surface and the surface on which the print layer included in the second layer is provided is assumed to be the second surface.

When observing the printed matter 102 by reflected light, basically only the print layer included in the first layer 110 is observed, and the print layer included in the second layer 120 is not observed. Meanwhile, when observing the printed matter 102 by transmitted light (and reflected light which is environment light), the composition of print layers included in all layers is observed. There may be two or more print layers configuring the second layer 120.

In the present embodiment, a white PET film having good glossiness and light transmission uniformity is used for the base material of the medium layer 112, and an ink reception layer is provided on a printable surface of the base material. Accordingly, in the example of FIG. 3A, an ink reception layer is provided on each of the front surface and the back surface of the medium layer 112, and in the example of FIG. 3B, an ink reception layer is provided on one side of the medium layers 112 and 122. Note that an ink reception layer is not provided in the case where normal paper is used as the recording medium.

Figure 4:
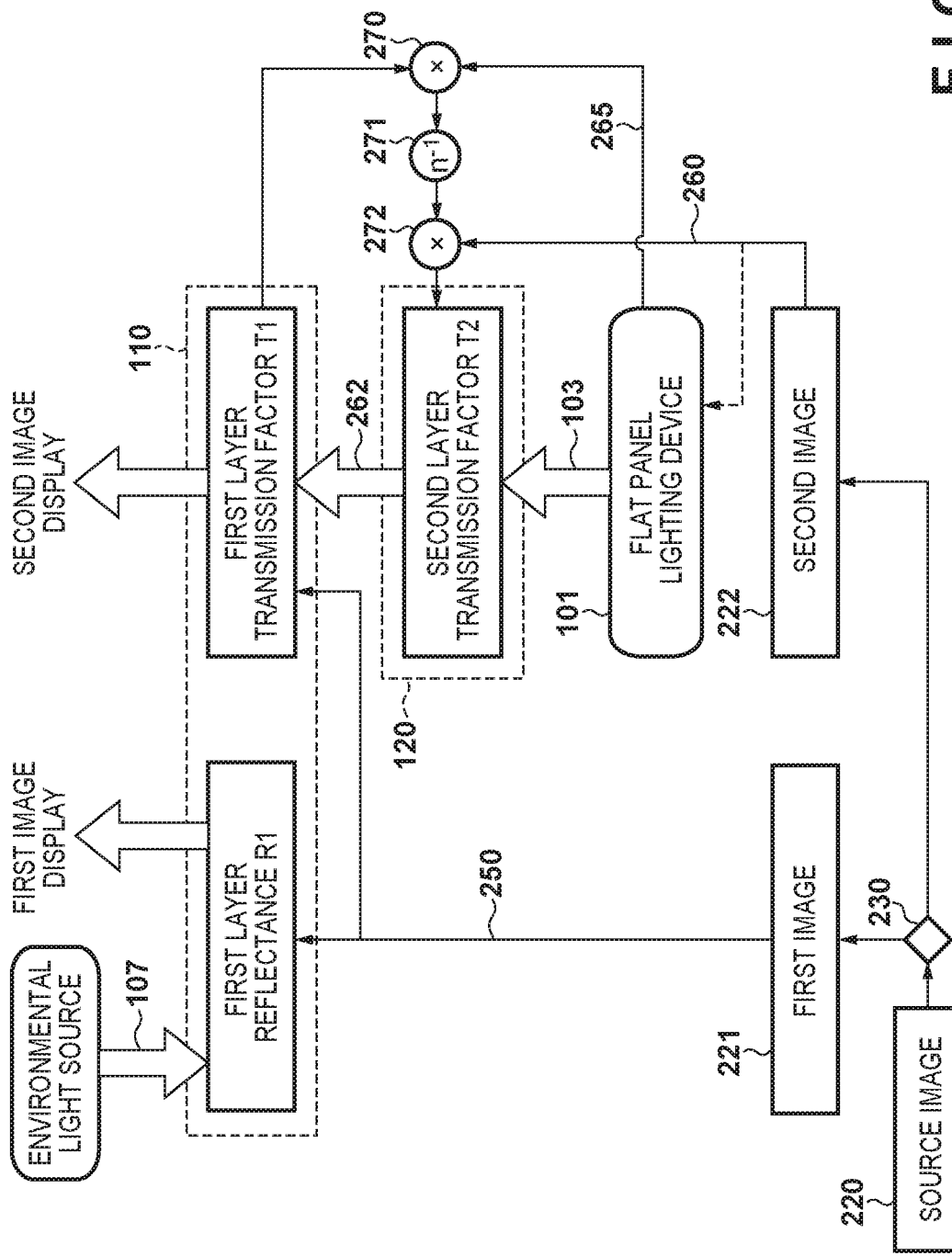
FIG. 4 is a view that schematically illustrates a print control operation in the first embodiment.
Figure 6:
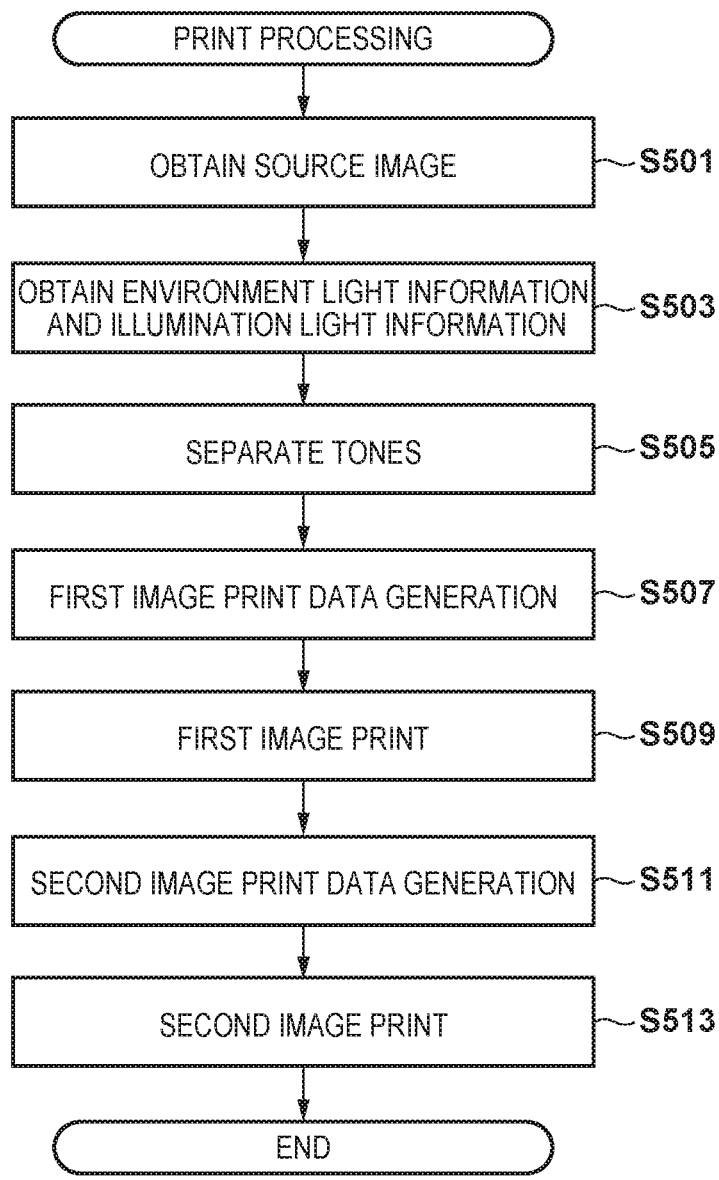
FIG. 6 is a flowchart of a print control operation in the first embodiment.

FIG. 4 is a view that schematically illustrates a print control operation of a print control apparatus 200 of the present embodiment. Also, FIG. 6 is a flowchart of the print control operation. The print control operation described below is realized by the CPU 210 executing a program. The program that the CPU 210 executes may be an application, an OS, a printer driver, or the like.

In the present embodiment, observing printed matter by transmitted light is envisioned, and an image (HDR image) with a wider dynamic range than with normal capturing is used as a source image. An HDR image may be generated by any publicly known method such as compositing images that capture the same scene in different exposures, for example. The source image is assumed to be stored in the storage apparatus 213, but may be obtained from an external unit via the I/F 214. Also, the source image may be selected by a user of the PC 200.

In step S501, the CPU 210 obtains a source image 220.

In step S503, the CPU 210 obtains environment light information and illumination light information. This information is respectively luminance information of environment light 107 and of the illumination light 103. Since the luminance of the illumination light 103 is determined depending on the specification of the flat panel lighting device 101, it is possible to store it in the ROM 212 in advance. Also, regarding environment light, in the case where the location in which the printed matter 102 will be observed is known in advance, it is possible to take actual measurements and store them in the ROM 212 in advance. Alternatively, the luminance sensor/camera 217 may be used to perform actual measurements on site.

In step S505, the CPU 210 applies a tonal separation 230 to the source image 220. By the tonal separation 230, a first image 221 for forming a print layer (the front surface print layer 111) of the first layer 110 and a second image 222 for forming a print layer (the back surface print layer 120 or the front surface print layer 121) of the second layer 120 are obtained from the source image 220.

Figure 5:
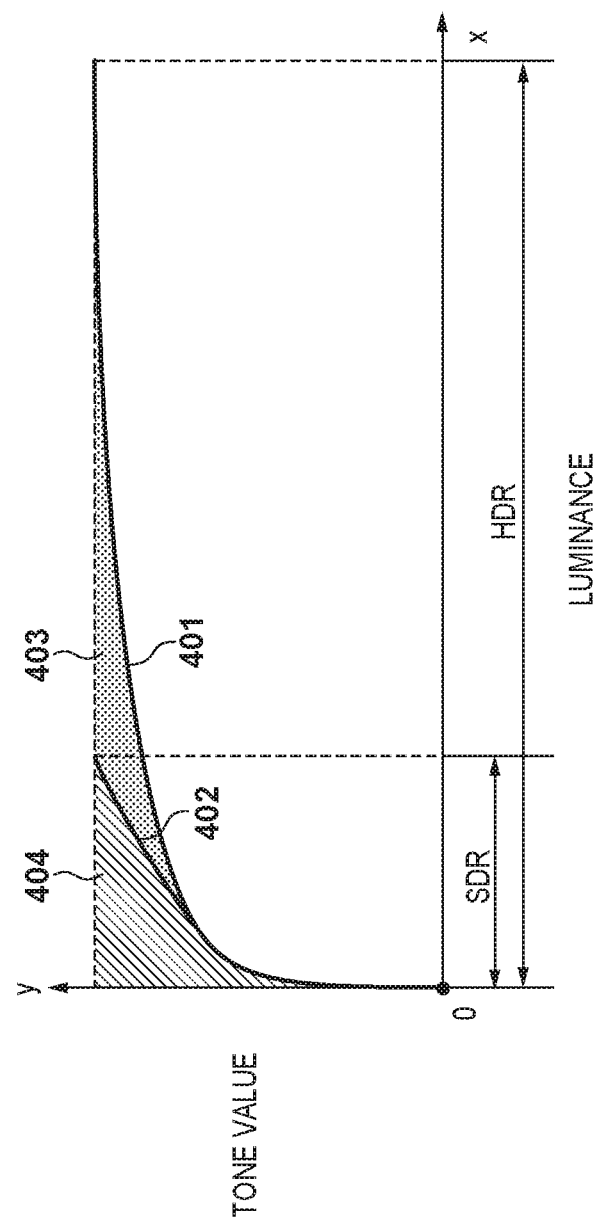
FIG. 5 is a view related to a tonal separation in the first embodiment.

The tonal separation 230 is explained using FIG. 5. The abscissa x is luminance and the ordinate y is tone value. The source image 220 has tone values resulting from a conversion using a gamma curve 401 corresponding to an input luminance of a high dynamic range (HDR) which is wider than a conventional luminance dynamic range (SDR: Standard Dynamic Range). In the field of HDR, a luminance-tone conversion characteristic is referred to as OETF (Optical-Electro Transfer Function), and HLG (Hybrid Log-Gamma) and PQ (Perceptual Quantization) are known as representative OETFs.

A gamma curve 402 corresponding to SDR is, for example, $\gamma=2.2$ to 2.4 approximately, and the maximum luminance that is covered is approximately 100 [nit]. Meanwhile, the maximum luminance that the gamma curve 401 corresponding to HDR covers is on the order of several 100 to 10000 [nit].

By the tonal separation 230, the CPU 210 assigns an SDR tone portion 404 to the first image 221. Also, the CPU 210 assigns to the second image 222 a differential tone portion 403 that excludes the SDR tone portion 404 from the HDR full range tone at a predetermined ratio. In FIG. 5, a case in which the predetermined ratio is 1 (in other words, a difference image resulting from subtracting the SDR image from the HDR image) is illustrated. The predetermined ratio is determined in accordance with an intensity ratio of the luminance of reflected light of the environment light 107 in relation to the luminance of transmitted light of the illumination light 103 of the flat panel lighting device 101. The environment light 107 may be natural light, and may be light that an artificial light source such as a spotlight generates.

In the present embodiment, the CPU 210 obtains a transmission factor and reflectance of the recording medium which is to be used for printing in the printer 219, based on a type of the recording medium. The type of the recording medium and the corresponding transmission factor and reflectance are stored in advance in the ROM 212, for example.

For example, if, in a state of a blank sheet on which nothing is printed, the luminance of the transmitted light of the illumination light 103 and the reflected light of the environment light 107 are equivalent, then the predetermined ratio is made to be 1. Since the illumination light 103 ceases to be present when the flat panel lighting device 101 is turned off at this time, only the first image 221 of the SDR tones is observed, and the second image 222 is not observed. Also, when the flat panel lighting device 101 is turned on, by the illumination light 103, an image into which the first image 221 and the second image 222 are composited is observed. This composite image has HDR tones similar to the source image 220.

Also, in the case where it is desired to observe the source image 220 by the illumination light 103 in a dark room state where the environment light 107 is not present, the predetermined ratio is made to be 0, and SDR tones are assigned to the first image 221, and HDR full range tones are assigned to the second image 222. In such a case, when the environment light 107 occurs when observing the second image 222 by the illumination light 103, the SDR tone portion 404 of the first image 221 is overlapped, even though the luminance of intermediate tones becomes higher, the image does not appear unnatural. This is due to the luminance discrimination area value characteristics of the human eye. An increase in intermediate luminance due to the SDR tone portion 404 of the first image 221 being overlapped when the HDR full range tone of the second image 222 is displayed brightly by the illumination light 103 is relatively difficult to perceive.

Here, different tones are assigned to the first image 221 and the second image 222, but more simply the same tones may be assigned. In such a case, the portion corresponding to the bottom ½ of the luminance range of the full range of the gamma curve 401 is used as the gamma curve 402.

In the case where a tonal separation is not performed, by printing the source image 220 in accordance with conditions in which that the flat panel lighting device 101 is turned on, it is possible to suitably observe the source image 220 by HDR full range tones in a state in which the flat panel lighting device 101 is turned on. Note that the luminance dynamic range is compressed because the luminance needed for an HDR full range display cannot be attained when the flat panel lighting device 101 is turned off since there is only the reflected light according to the environment light 107. For example, assume that the peak luminance of the highlight display portion is ¼ when the flat panel lighting device 101 is turned off. In such a case, the overall brightness becomes ¼, and therefore the image becomes too dark and the color appears dull. Since this also is due to the luminance discrimination area value characteristics of the human eye, a reduction in the luminance of intermediate tones when peak luminance decreases is more sensitively perceived.

Meanwhile, even in the case where the tonal separation 230 is performed, there is no difference when observing HDR tones that the source image 220 has when the flat panel lighting device 101 is turned on. However, since the first image observed by the environment light 107 is of SDR tones when the flat panel lighting device 101 is turned off, there is a difference in that the reduction in luminance of intermediate tones is avoided, and suitable observation is possible.

Figure 7A:
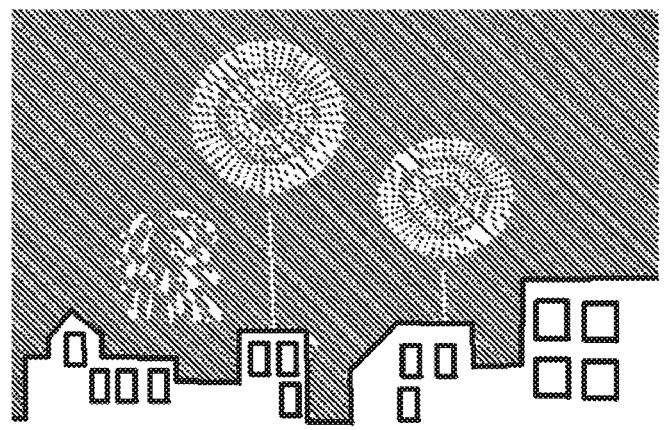
FIGS. 7A to 7C are views that schematically illustrate examples of a source image, a first image, and a second image.

FIG. 7A is a view that schematically illustrates an example of the source image 220. In an image that was HDR-captured, highlight portions through to shadow portions are recorded with a high dynamic range.

Figure 7B:
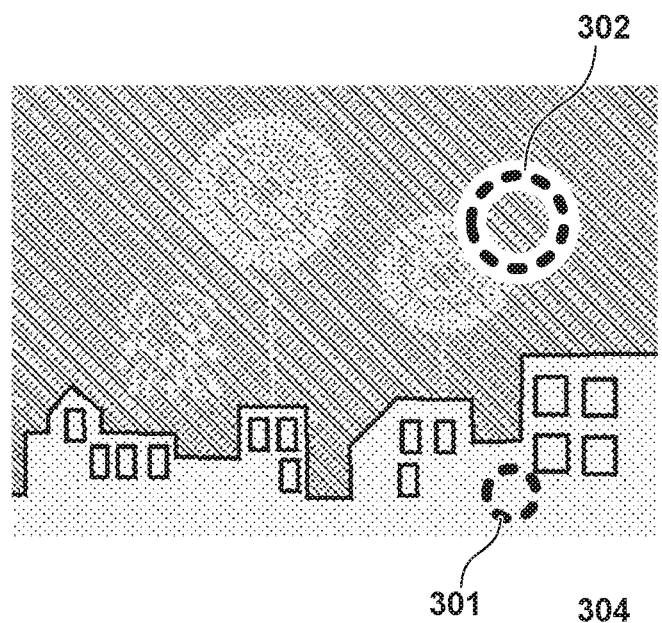

FIG. 7B is a view that schematically illustrates an example of the first image 221 generated by the tonal separation 230. It is an SDR image in which tones of a highlight portion 301 of a cityscape and a high luminance portion 302 of fireworks are compressed in relation to the source image 220 illustrated in FIG. 7A.

Figure 7C:
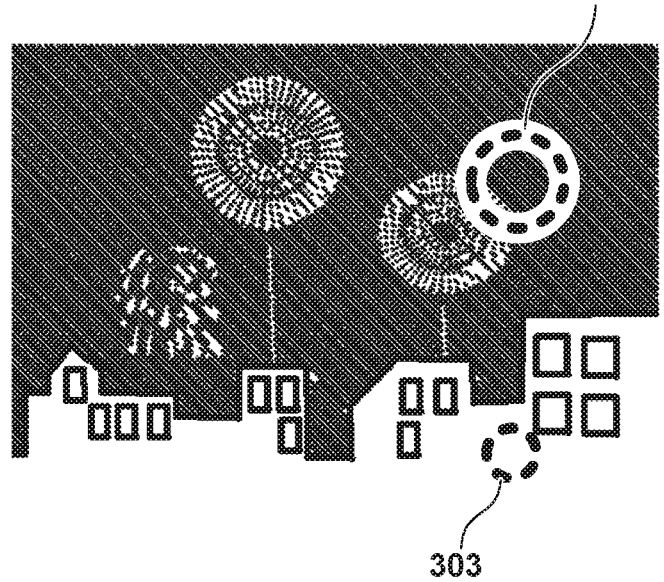

FIG. 7C is a view that schematically illustrates an example of the second image 222 generated by the tonal separation 230. In the source image 220 illustrated in FIG. 7A, for a highlight portion 303 of the cityscape and a high luminance portion 304 which is a firework, tones that cannot be covered by SDR tones are assigned.

Returning to FIG. 6, in step S507, the CPU 210 (second generation unit) generates print data (first print data) that is based on the first image 221 which corresponds to SDR obtained by tonal separation. Specifically, the CPU 210 performs a color matrix conversion of the first image 221 which is inputted in an RGB signal into signals for each ink color (for example, CMYK signals). Then, print data is generated based on profile settings in accordance with a combination of a post-conversion signal, the model of the printer 219, the types of ink, the type of paper, or the like.

In step S509, the CPU 210 outputs the print data generated in step S507 to the printer 219 to form the front surface print layer 111. The processing of step S507 and step S509 is similar to typical conventional print processing, and so description of the details thereof will be omitted.

When the front surface print layer 111 is formed, a first layer reflectance R1 is decided by the reflectance of the recording medium (the medium layer 112 of the first layer 110) and the reflectance of the ink used for forming the front surface print layer 111. Note that the first layer reflectance R1 can be calculated in units of pixels and in units of ink colors, based on the reflectance of the recording medium, the reflectance of the inks, and the print data. The environment light 107 reflects on the front surface of the printed matter 102 at the first layer reflectance R1, and the optical image according to the reflected light of the first image is thereby observed.

When the front surface print layer 111 is formed, a first layer transmission factor T1 is decided by the transmission factor of the recording medium (the medium layer 112 of the first layer 110) and the transmission factor of the ink used for forming the front surface print layer 111. The first layer transmission factor T1 is assumed to be decided in units of pixels and units of ink colors. It can be calculated in units of pixels and in units of ink colors, based on the transmission factor of the recording medium, the transmission factor of the inks, and the print data.

Next, in step S511, the CPU 210 (second generation unit) generates print data (second print data) that is based on the second image 222 of an HDR tone portion obtained by tonal separation.

The second image 222 is an image that is printed on the side of the flat panel lighting device with respect to the first image 221 so that an image having similar HDR tones to the source image can be observed when the illumination light 103 is present. Specifically, the main functions of the second image are to suppress backlight bleeding of the first image due to increased luminance in accordance with the illumination light 103 and to provide tones in a portion of the luminance of light that cannot be covered by SDR.

For that reason, when generating print data of the second image 222, it is necessary to realize a second layer transmission factor T2 such that the composite image that composes the first image 221 and the second image 222 to be observed by the transmitted light of the illumination light 103 has a tonality similar to that of the source image 220. The CPU 210, prior to generating the print data that is based on the second image 222, calculates a second layer transmission factor T2 for each pixel, and converts the RGB data into data for each ink color so as to realize the calculated transmission factor.

Since the illumination light 103 is observed after it is transmitted through the second layer and the first layer, the luminance of the transmitted light is represented by illumination light luminance×second layer transmission factor T2×first layer transmission factor T1. Also, since the luminance of the transmitted light depends on a corresponding tone, the second layer transmission factor T2 corresponding to a particular tone can be obtained by second layer transmission factor T2=tone/(illumination light luminance×first layer transmission factor T1). Note that in the case of using a plurality of recording mediums as in FIG. 3B, a value that divides the second layer transmission factor T2 by the transmission factor of the second layer recording medium may be used.

In FIG. 4, (illumination light luminance 265×the first layer transmission factor T1) is obtained by a multiplier 270, and by multiplying, in a multiplier 272, its reciprocal, which is obtained in a divider 271, by a tone 260 of the second image 222, the second layer transmission factor T2 is calculated. The tone may be a value for each R, G, and B component, for example.

The CPU 210 generates CMYK data that realizes the second layer transmission factor T2 when the second layer transmission factor T2 is calculated for each pixel. For example, in a case where the transmission factor according to the ink amount when RGB is converted into CMYK deviates from the second layer transmission factor T2, it is possible to increase/decrease the ink amount while suppressing a change in tint. In this way, in the present embodiment, print data that represents the second image 222, which corresponds to a difference between the source image and the first image 221 which is observed by the transmitted light, is generated.

In step S513, the CPU 210 outputs the print data generated in step S511 to the printer 219 and forms the back surface print layer 120 or the front surface print layer 121, and ends the processing. The processing of step S513 is similar to typical conventional print processing, and so description of the details thereof will be omitted.

When observing printed matter obtained in this way in the flat panel lighting device 101, the reflected image of the first image according to the environment light 107 is observed in a state in which the flat panel lighting device 101 is turned off. The observed first image is an SDR image. When the flat panel lighting device 101 is turned on in this state, all of the printed matter is illuminated from the back surface, and therefore an optical image according to transmitted light ends up being observed. In addition to a maximum luminance of the printed matter increasing due to the illumination light, backlight bleeding is suppressed by the second image, and therefore the luminance dynamic range of the printed matter is enlarged. As described above, the printing density of the second image is controlled so that the luminance of the composite image according to the transmitted light transmitted through the first image and the second image becomes similar to the luminance of the source image. Accordingly, when the flat panel lighting device 101 is turned on, the printed matter ends up being observed as an HDR image.

As described above, by virtue of the present embodiment, an image, whose tonal number is enlarged when observing by transmitted light of an illumination light that illuminates from behind printed matter, is printed on the back surface of a recording medium on which an image to be observed by reflected light is printed, or is printed on another recording medium that is arranged at a back surface side. Accordingly, observation in which there is no sense of unnaturalness in the case of observation of the printed matter by reflected light and the case of observation of the printed matter by transmitted light becomes possible.

Note that in a case such as where the source image is not an HDR image, the source image may be used as the first image and the second image. In such a case, an image having higher contrast when the flat panel lighting device 101 is turned on than when it is turned off will be observed.

(Second Embodiment)

The first embodiment is predicated on the luminance of the illumination light 103 by which the flat panel lighting device 101 irradiates the back surface of the printed matter 102 being substantially uniform. In contrast to this, in the present embodiment, description is given of a case in which the flat panel lighting device 101 can control the luminance of the illumination light 103 for each area. Note that in the description below, the same reference numerals are added to the same members as in the first embodiment, and redundant description is omitted.

In the present embodiment, the flat panel lighting device 101 has a plurality of light sources, and the luminance of the illumination light 103 is variable in units of several tens to several hundreds of areas, for example. Also, the CPU 210, as illustrated by dotted lines in FIG. 4, controls the luminance of the illumination light 103 by the tone 260 of the second image 222. For example, the CPU 210 calculates a representative luminance for each of the areas into which the second image 222 is divided similarly to the luminance control units in the flat panel lighting device 101. The representative luminance is made to be an average luminance, for example. Also, the CPU 210, based on the representative luminance, controls the luminance of a corresponding area of the flat panel lighting device 101. For example, the CPU 210 increases the luminance of the illumination light 103 of a corresponding area for an area whose representative luminance is high, and controls the luminance of the illumination light 103 of a corresponding area to be low for an area whose representative luminance is low.

Figure 8A:
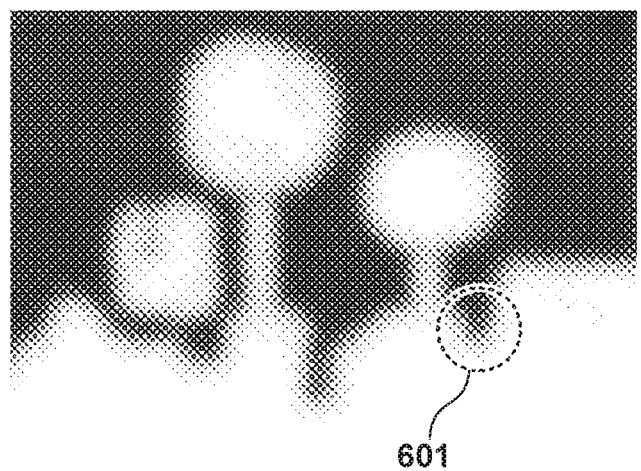
FIGS. 8A to 8C are views that schematically illustrate examples of illumination light luminance distribution and a second layer transmission factor in a second embodiment.

FIG. 8A schematically illustrates a luminance distribution of the illumination light 103 in a case where the second image 222 is what is illustrated in FIG. 7C. For high tone portions, the luminance is high, and for low tone portions, the luminance is low. Because the number of areas whose luminance can be adjusted is less than the number of pixels of the second image, the luminance of the flat panel lighting device has a distribution such that the second image is smoothed. Also, a halo 601 is generated in an outline portion at which a brightness difference is large.

Figure 8B:
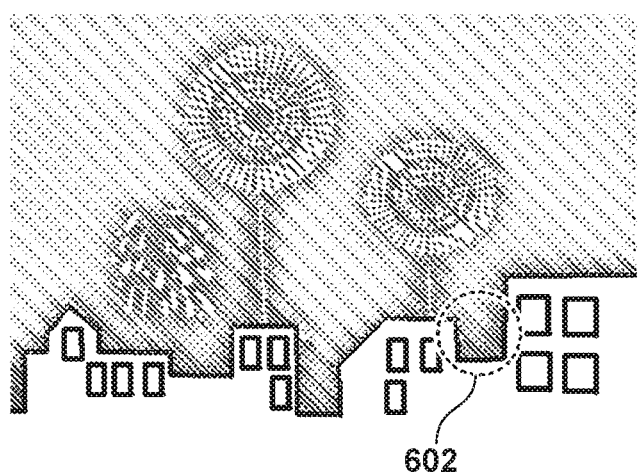

In the present embodiment, a luminance of an area of the flat panel lighting device 101 corresponding to the position of the pixel is used as the illumination light luminance for when calculating the second layer transmission factor T2 for each pixel. Furthermore, the CPU 210 detects an edge portion whose tonal change is large in the second image, and adds a change in order to cancel out the halo in the second transmission factor T2 of the portion neighboring the edge portion. FIG. 8B illustrates the second layer transmission factor T2 calculated for each pixel of the second image as an image, and areas whose transmission factor is low neighboring an edge portion (referred to as an inverted halo), as indicated by reference numeral 602, are included. Note that a halo 601 of FIG. 8A and the inverted halo 602 of FIG. 8B indicate halo and inverted halo portions. As is clear from FIG. 8A to FIG. 8B, halos and inverted halos are present at other edge portions as well.

Figure 9A:
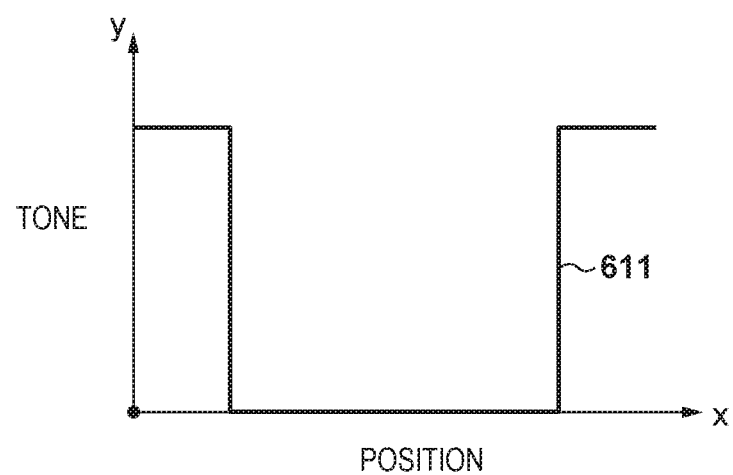
FIGS. 9A to 9C are views that illustrate examples of a halo and an inverted halo in the second embodiment.
Figure 9B:
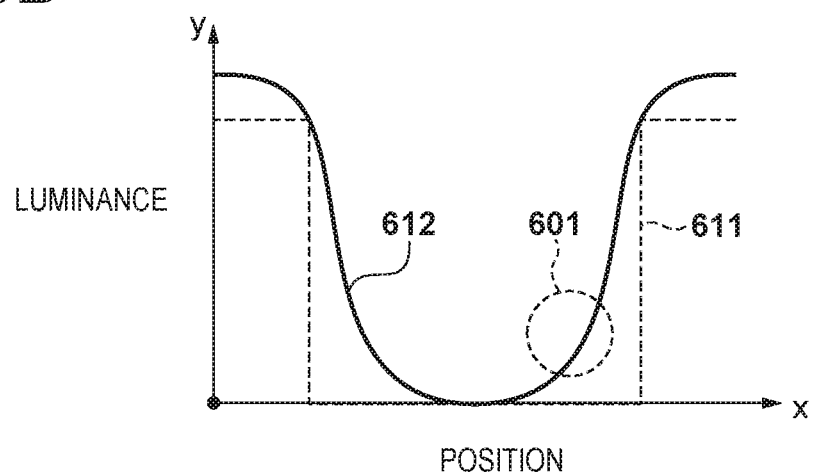
Figure 9C:
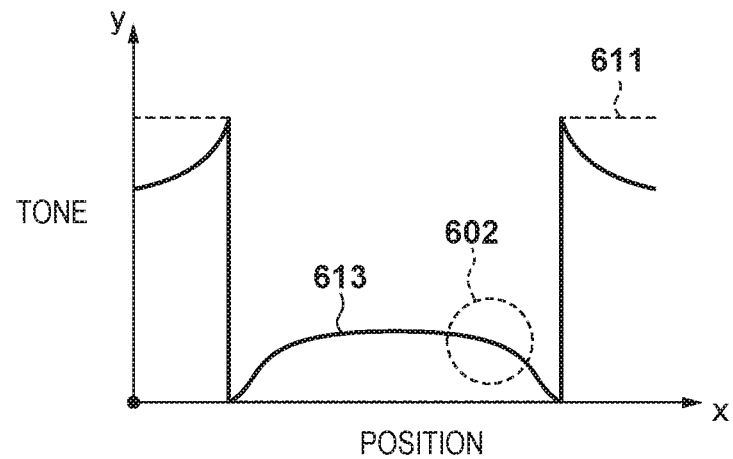

Examples of characteristics of the halo 601 and the inverted halo 602 is illustrated in FIGS. 9A to 9C. The abscissa x-direction indicates the position in the plane, and the ordinate y-direction indicates tone or luminance.

FIG. 9A illustrates a tone 611 of the edge portion of the second image 222. For example, this corresponds to the positions at which the highlight portion of the cityscape and the shadow portion of the night scene are neighboring.

FIG. 9B illustrates an example of a luminance change 612 of the illumination light 103 at the edge portion corresponding to FIG. 9A. Because the spatial resolution for control of the luminance of the illumination light 103 is lower than the spatial resolution of the second image, the halo 601 is occurring due to the luminance change.

FIG. 9C indicates an example of a change 613 of the second layer transmission factor T2. The inverted halo 602 which is a tonal change for cancelling out the halo 601 of FIG. 9B is provided to the second layer transmission factor T2. By executing printing after providing the tonal change for such a halo cancelling out to the edge portion of the second layer transmission factor T2, the influence due to the halo 601 generated in the flat panel lighting device 101 can suppress the influence on the printed matter that is to be observed.

Note that the inverted halo 602 that is provided to the calculated second layer transmission factor T2 depends on the configuration of the flat panel lighting device 101. For that reason, it is possible to measure halos generated in a luminance distribution of the flat panel lighting device 101 in advance, and store transmission factor change patterns to be provided in the proximity of the edge portion of the second layer transmission factor T2 in order to cancel them out. Then, after first calculating the second layer transmission factor T2 in a state in which the inverted halo 602 is not provided, the CPU 210 can detect an edge portion, and provide the inverted halo 602 by applying the stored change pattern to the portion neighboring the edge portion.

A configuration in which the luminance of the illumination light 103 can be controlled for each area is described, but configuration may be such that, for example, all luminances are changed in accordance with a maximum luminance tone of the second image 222. Also, the brightness of the environment light 107 is detected by an optical sensor or the like, and so as to enhance the luminance of the illumination light 103 in a case where the environment light 107 is bright, the brightness of the illumination light 103 may be adjusted in accordance with the brightness of the environment light 107.

As described above, by virtue of the present embodiment, there is the effect that it is possible to suppress the influence on an image in which a halo of illumination light, which may occur in a case where a flat panel lighting device that can change the luminance for each area is employed is observed, by printing to the second layer.

Other Embodiments

In the embodiments described above, description is given of a configuration in which a luminance dynamic range of printed matter that is illuminated by the flat panel lighting device 101 is made to appear to be expanded by turning on the flat panel lighting device 101. However, configuration may be taken to make the color gamut appear to be expanded by turning on the flat panel lighting device 101, for example.

In such a case, when the color depth of the source image is 10 bits, for example, a tonal separation that makes the color depth of the first image be the bottom 8 bits and the color depth of the second image be the top 2 bits is performed. Accordingly, by configuring similarly to the luminance dynamic range, it is possible to expand the color gamut of the printed matter that is observed.

Figure 8C:
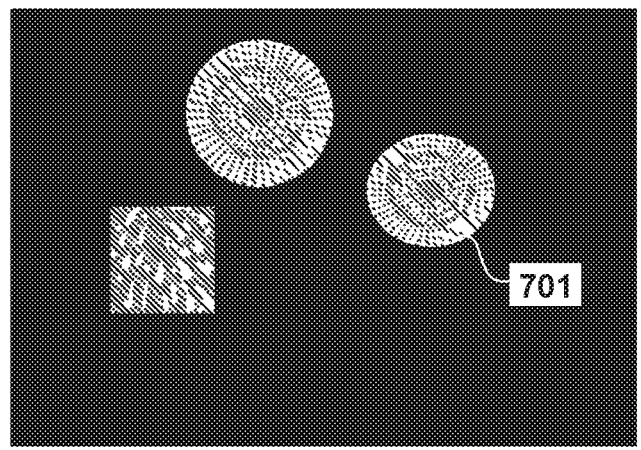

FIG. 8C schematically illustrates an example of the second image 222 resulting from a tonal separation from the source image, for example. The tonal separation is performed making the wide color gamut of the fireworks and the high luminance portion 701 be the second image 222. By printing, on the second layer, print data generated based on this second image, observation of printed matter with a wide color gamut is enabled when the flat panel lighting device 101 is turned on.

Also, for the light source of the flat panel lighting device 101 it is possible to use a white LED of a cold-cathode tube or a broad band type, but an RGB laser may also be used, for example.

Figure 10:
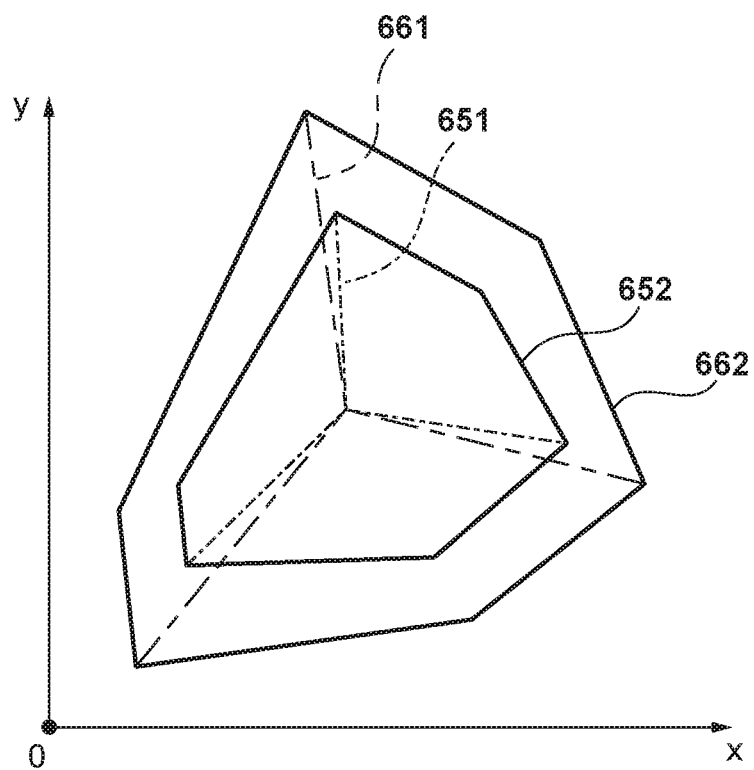
FIG. 10 is a view that illustrates an example of a color gamut of a flat panel lighting device whose light source is an RGB laser.

FIG. 10 is an xy chromaticity diagram that illustrates, in a CIE XYZ color system, an example of a chromaticity diagram for a case where an RGB laser is used as the light source of the flat panel lighting device 101. A maximum color gamut 652 when the flat panel lighting device 101 is turned off is a hexagon decided by CMYK hues and a peak spectrum 651 of the environment light 107. Meanwhile, it is expected that a maximum color gamut 662 for when the flat panel lighting device 101, in which an RGB laser is used for a light source, is turned on will be double by area ratio in relation to the maximum color gamut 652 when the flat panel lighting device 101 is turned off. Also, regarding the shape, a hexagon for which a peak spectrum 661 of the RGB laser is made to be the apex is indicated. Accordingly, in a case where the flat panel lighting device 101 in which an RGB laser is used as a light source is employed, a wide color gamut can be viewed when the flat panel lighting device 101 is turned on.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-122471, filed on Jun. 22, 2017, which is hereby incorporated by reference herein in its entirety.

What is claimed is:

1. A print control apparatus, comprising:
a first generation unit configured to, based on data of a source image, generate first print data to be used for printing to a first surface of a recording medium; and
a second generation unit configured to, based on data of the source image, generate second print data to be used for printing to a second surface different from the first surface, wherein:
the second print data provides a higher luminance dynamic range to a composite image of an image according to the first print data and an image according to the second print data, which is to be observed when a recording medium on which the first print data and the second print data are printed is illuminated by light of a higher luminance than an environment light, than to an image according to the first print data, and
the first generation unit and the second generation unit are implemented via at least one processor.

2. The print control apparatus according to claim 1, wherein the first print data represents a luminance range, in the luminance range that the data of the source image, of the environment light that is defined in advance.

3. The print control apparatus according to claim 1 wherein the second generation unit generates, as the second print data, print data that represents an image that corresponds to a difference between the source image and an image according to the first print data to be observed by transmitted light that is transmitted through the recording medium.

4. The print control apparatus according to claim 3, wherein the second generation unit, based on a transmission factor of the recording medium and a transmission factor of an image printed on the first surface, generates the second print data.

5. The print control apparatus according to claim 4, wherein the second generation unit generates the second print data for controlling the transmission factor of the second surface such that a tone of the source image is attained by light that transmits through the second surface, the recording medium, and the first surface.

6. The print control apparatus according to claim 1, wherein the second generation unit, based on a characteristic of a light source that illuminates the first surface and the second surface, generates the second print data to which a tonal change, which is fur suppressing a halo that may he generated by the light source at an edge portion at which a tonal change is large, is provided.

7. The print control apparatus according to claim 1, wherein the second surface is the reverse surface to the first surface in the recording medium.

8. The print control apparatus according to claim 1, wherein the second surface is a surface of a recording medium that is different to the recording medium.

9. The print control apparatus according to claim 1, wherein the second print data represents a higher luminance range, in a luminance range that the data of the source image represents, than a luminance range that the first gnat data represents.

10. A method of controlling a print control apparatus, the method comprising:
based on data of a source image, first generating first print data to be used for printing to a first surface of a recording medium; and
based on data of the source image, second generating second print data to be used for printing to a second surface different from the first surface, wherein
the second print data provides a higher luminance dynamic range to a composite image of an image according to the first print data and an image according to the second print data, which is to be observed when a recording medium on which the first print data and the second print data are printed is illuminated by light of a higher luminance than an environment light, than to an image according to the first print data.

11. A non-transitory computer-readable medium storing a program for causing a computer to function as a print control apparatus that comprises:
a first generation unit configured to, based on data of a source image, generate first print data to be used for printing to a first surface of a recording medium; and
a second generation unit configured to, based on data of the source image, generate second print data to be used for printing to a second surface different from the first surface, wherein
the second print data provides a higher luminance dynamic range to a composite image of an image according to the first print data and an image according to the second print data, which is to be observed when a recording medium on which the first print data and the second print data are printed is illuminated by light of a higher luminance than an environment light, than to an image according to the first print data.

* * * * *